Patented Dec. 29, 1925.

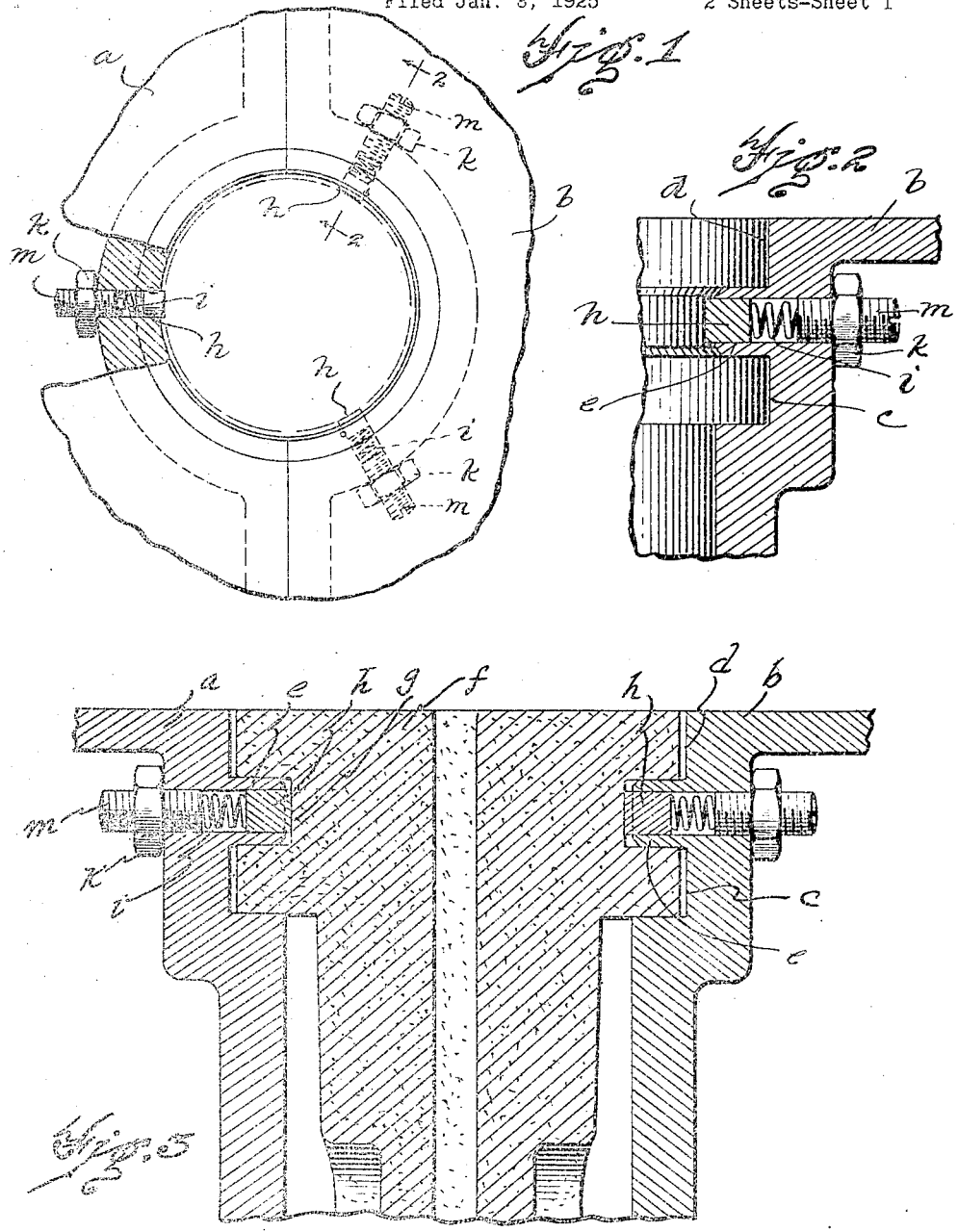

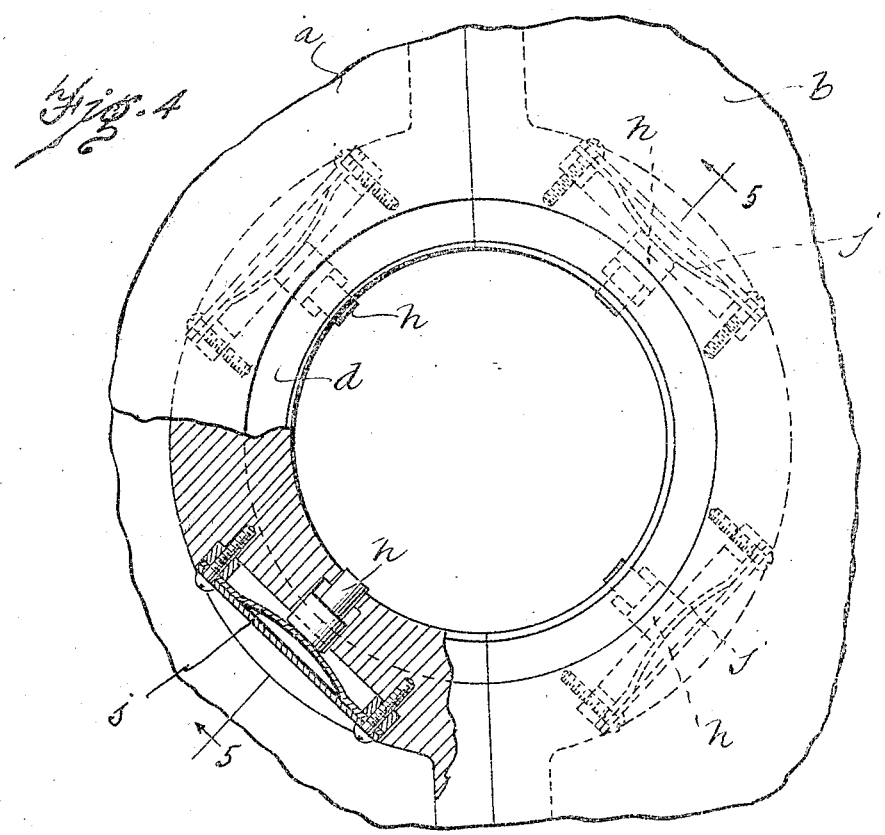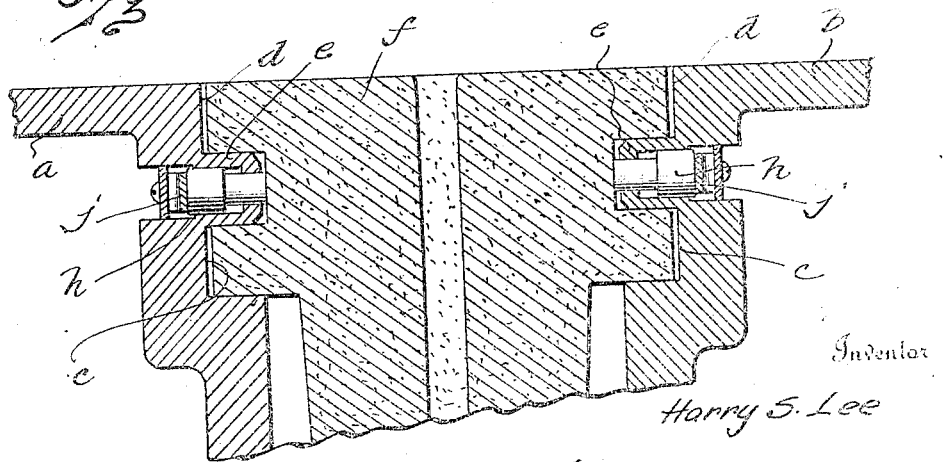

1,567,606

UNITED STATES PATENT OFFICE.

HARRY S. LEE, OF PLYMOUTH, MICHIGAN.

AUTOMATIC CORE CENTRALIZER.

Application filed January 8, 1925. Serial No. 1,167.

*To all whom it may concern:*

Be it known that I, HARRY S. LEE, a citizen of the United States, residing at Plymouth, in the county of Wayne and State of Michigan, have invented certain new and useful Improvements in Automatic Core Centralizers, of which the following is a specification.

This invention relates to permanent moulds and has for its object a permanent mould provided with means for automatically compensating for the expansion of the mould away from the core when the mould heats up. This results in accurately centralizing the core in the mould and prevents the core from shifting around so as to make an imperfect casting.

Permanent moulds made out of metals are bound to expand slightly as they heat up during the pouring operation. Where the core is supported in the permanent mould by means of contact with the walls of the mould it will be apparent that the mould walls will draw slightly away from the core, resulting in a condition which permits the core to shift slightly—a few thousandths of an inch. If such shifting takes place, which is quite likely, an accurate casting will not result.

In my co-pending application, Serial No. 1168 I have shown and described a mechanical adjustment by which this change of relations between the two members can be accommodated. In such application the generic invention is there claimed. The present application is directed to a different species of the generic invention. This species not only affords a different way to accomplish the same general object, but it has the added feature that the same automatically takes care of compensating for the expansion. Furthermore, it has the added feature that the strength of each individual automatic device may be altered to suit the observed conditions. This will be more fully explained hereinafter.

Referring to the drawings:

Fig. 1 is a plan view (fragmentary in character) of a moulded equipment with my automatic compensating device.

Fig. 2 is a section taken on the line 2—2 of Fig. 1.

Fig. 3 is a vertical section of the top of the mould and the core.

Fig. 4 is a plan view (fragmentary in character) of a modified form of the invention.

Fig. 5 is a section taken on the line 5—5 of Fig. 4.

The mould sections are designated $a$ and $b$, and are usually made of metal with a suitable coating on the interior of some refractory material of some special composition. The mould sections are grooved as at $c$ and $d$ to provide annular grooves and the intervening rib $e$. The core $f$ has similar ribs and a core may be fitted into the other section which will temporarily support it until the withdrawn mould section is replaced. This will suspend the core within the mould and in proper centralized position.

Due to the heating up of the mould due in the pouring operations the mould parts will expand several thousandths of an inch. This will leave a slight clearance around the head of the core which will permit it to shift slightly. I prevent this by an automatic compensating device, comprising a plurality of sliding blocks $h$ which are yieldingly urged against the core by means of the coil springs $i$ shown in Fig. 3, or by the flat springs $j$ shown in Fig. 5. These flat springs shown in Fig. 5 may also be subject to a thermal action, that is to say, as the springs heat up they too will expand and will have a stronger spring action on the sliding blocks. However, this thermal feature is not made the subject of the claims in the present application, but is made the subject of a co-pending application, Serial No. 1166, wherein the thermostatic principle of compensation is shown worked out in the most approved fashion.

The compression of the springs $i$ may vary slightly or may become impaired by wear. It is possible to nicely get the best possible adjustment of these springs by releasing the jamb nuts $k$ and applying a screw driver to the end of the screw stud $m$; for instance, if an inspection shows that there is a tendency for the core to shift slightly to one side, notwithstanding these compensating devices, this may be very easily remedied by increasing the spring strength on that side or weakening it on the other side, or both.

This type of the invention has the advantage that its action is automatic and no change is required of the compensating device at any time. If the moulds cool slightly during the interruption of the pourings it does not affect the operation of the device. However, it is not possible to get an absolutely fixed adjustment, as is the case with the compensating devices described in my co-pending application, Serial No. 1168.

What I claim is:

1. In a permanent mould, the combination of a plurality of expansible mould sections, a core supported in the mould sections by contact with the same, and an automatic means for centralizing the core notwithstanding change of conditions due to the expansion of the mould sections.

2. In a permanent mould, the combination of a plurality of expansible mould sections, a non-expansible core supported in the mould by contact with the mould sections, and an automatic means for taking up any clearance between the core and the mould sections due to the expansion of the mould sections.

3. In a permanent mould, the combination of a plurality of expansible mould sections, a non-expansible core supported in the mould by contact with the mould sections and adjustable strength automatic means in the form of sliding spacers for taking up any clearance that may exist between the core and the mould due to the expansion of the latter.

4. In a permanent mould, the combination of a plurality of expansible mould sections, a core supported therein by contact with the mould sections, sliding spacers supported in the mould sections and yielding members urging the spacers on to the core to centralize the core notwithstanding the expansion of the mould sections.

5. In a permanent mould, the combination of a plurality of expansible mould sections, a core supported therein by contact with the mould sections, a plurality of sliding blocks supported in the mould sections, and springs tending to urge the blocks into contact with the core to take up the clearance due to the expansion of the mould sections.

6. In a permanent mould, the combination of a plurality of mould sections of expansible material, a core supported therein by contact with the walls of said sections, and a plurality of sliding blocks for engaging the cores, springs for projecting the blocks and adjustable abutments for the springs.

In testimony whereof I have affixed my signature.

HARRY S. LEE.